United States Patent

[11] 3,584,586

[72] Inventors Charles G. Manley
  Mission Hills;
  John R. Hopkins, Kansas City; George C. Andreopoulos, Leawood; Richard A. Braeking, Gladstone; Francis Leo Lomaglio, Kansas City, all of, Mo.
[21] Appl. No. 788,373
[22] Filed Jan. 2, 1969
[45] Patented June 15, 1971
[73] Assignee Manley, Inc.
  Kansas City, Mo.

[54] AUTOMATIC FOOD PROCESSING MACHINE AND METHOD
  18 Claims, 3 Drawing Figs.
[52] U.S. Cl........................................... 107/7,
  107/54
[51] Int. Cl......................................... A23g 3/20

[50] Field of Search........................................ 107/7, 4.7, 54.6; 99/134—138, 342, 80

[56] References Cited
  UNITED STATES PATENTS
  2,958,602  11/1960  Glmore ..................... 99/80
  3,294,039  12/1966  Ogden ...................... 107/54.6

Primary Examiner—Louis K. Rimrodt
Attorney—Schmidt, Johnson, Hovey, Williams and Chase ABSTRACT: Through use of a single vessel, the initial steps of cooking, addition and blending of certain ingredients are temperature controlled to prepare a first cooked product, whereas the subsequent steps of adding and blending a second food product with the cooked admixture is time controlled to automatically produce successive batches of the end product in continuous cycles.

Charles G. Manley
John R. Hopkins
George C. Andreopoulos
Richard A. Braeking
Francis Leo Lomaglio
INVENTORS.

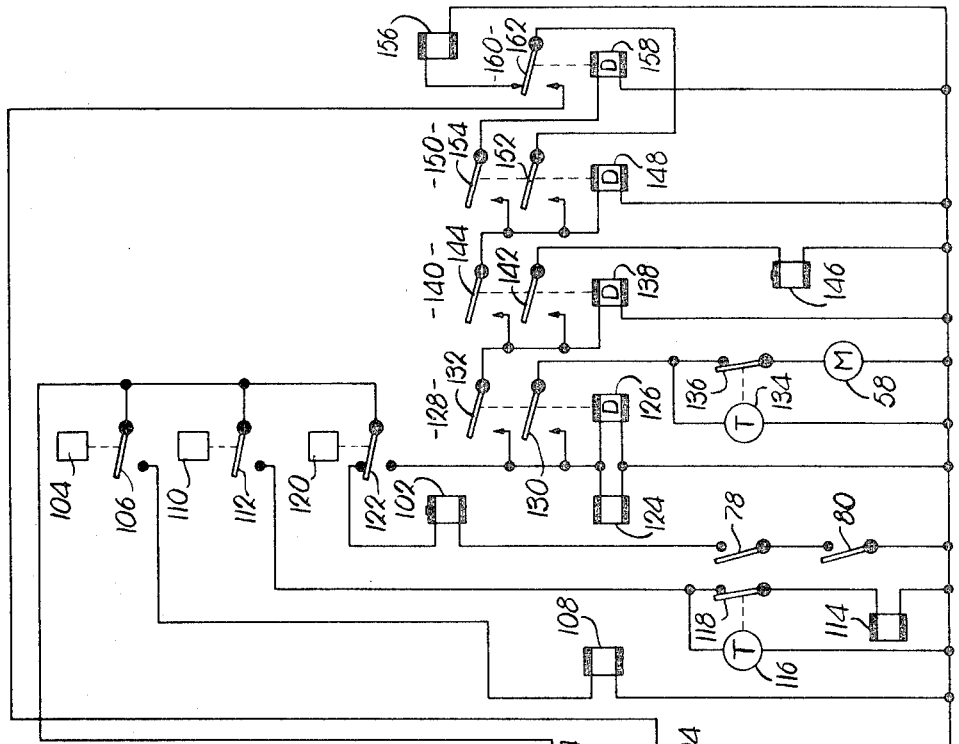
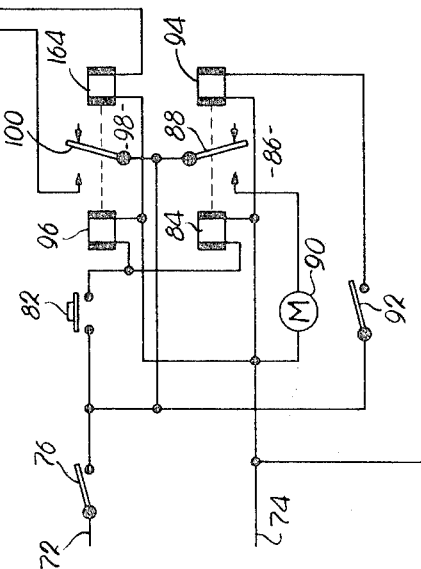
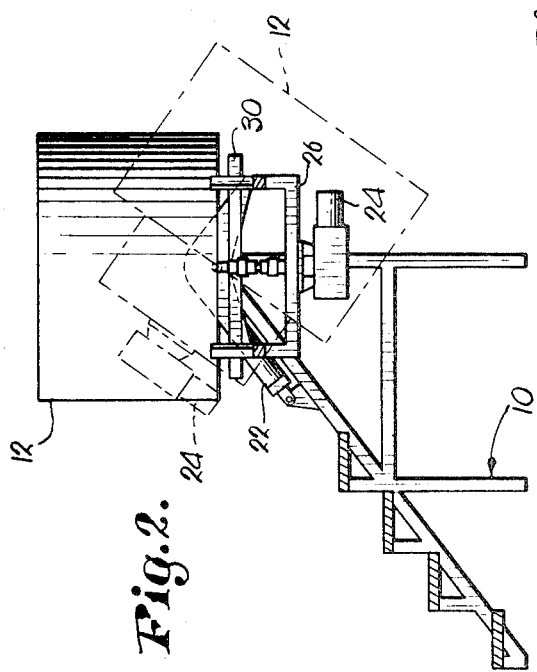
Charles G. Manley
John R. Hopkins
George C. Andreopoulos
Richard A. Braeking
Francis Leo Lomaglio
INVENTORS.

AUTOMATIC FOOD PROCESSING MACHINE AND METHOD

This invention relates to commercial processing of foods on an economic basis, a primary object of which is to reduce cost by increasing the rate of production with less labor while, at the same time, maintaining high quality and otherwise meeting the tastes and demands of the purchasing public.

The objects of our present invention are attained by use of a system of temperature and time controls such that production can be carried out automatically notwithstanding the fact that taste and appearance of the end product must meet rather high standards in order to be commercially acceptable.

While, in the interest of clarity, the instant improvements will, for the most part, hereafter be set forth in connection with the production of caramel corn, it will be readily apparent that our invention is fully applicable to a wide variety of food products.

The art of commercial production of caramel corn, for example, as it has existed for many years up to the resent time consists of cooking a basic syrup over an open flame in a copper vessel. Brown sugar and corn syrup are put together and raised to a temperature of approximately 270° F., at which point a caramelizer and a little butter are added. All of the material emulsifies and when the foaming subsides, some more butter is added and the heat is removed. Then the big hot kettle with its 30 to 40 pound batch of syrup is lifted by two men and the contents of the kettle poured over popped popcorn in a mixing vessel. In the mixing step much of the popcorn is broken into small fragments and wasted.

It is an important object of our present invention to provide a process which eliminates the aforementioned time-consuming and laborious steps, and which materially reduces the waste problem.

Another important object of the instant invention is to provide a method of producing a food product n a large scale basis that makes possible the use of a single kettle into which all of the ingredients are successively fed in measured quantities, thoroughly blended, and properly heated, all automatically and with separate temperature and time controls that assure a uniform, commercially acceptable end product from batch to batch regardless of the various ambient conditions under which the operations are carried out.

In the drawings:

FIG. 2 is a fragmentary side elevational view of the machine shown in FIG. 1 illustrating the dumping characteristics of the kettle; and FIG. 3 is a wiring diagram illustrating the electrical components of the machine.

Figure 1:
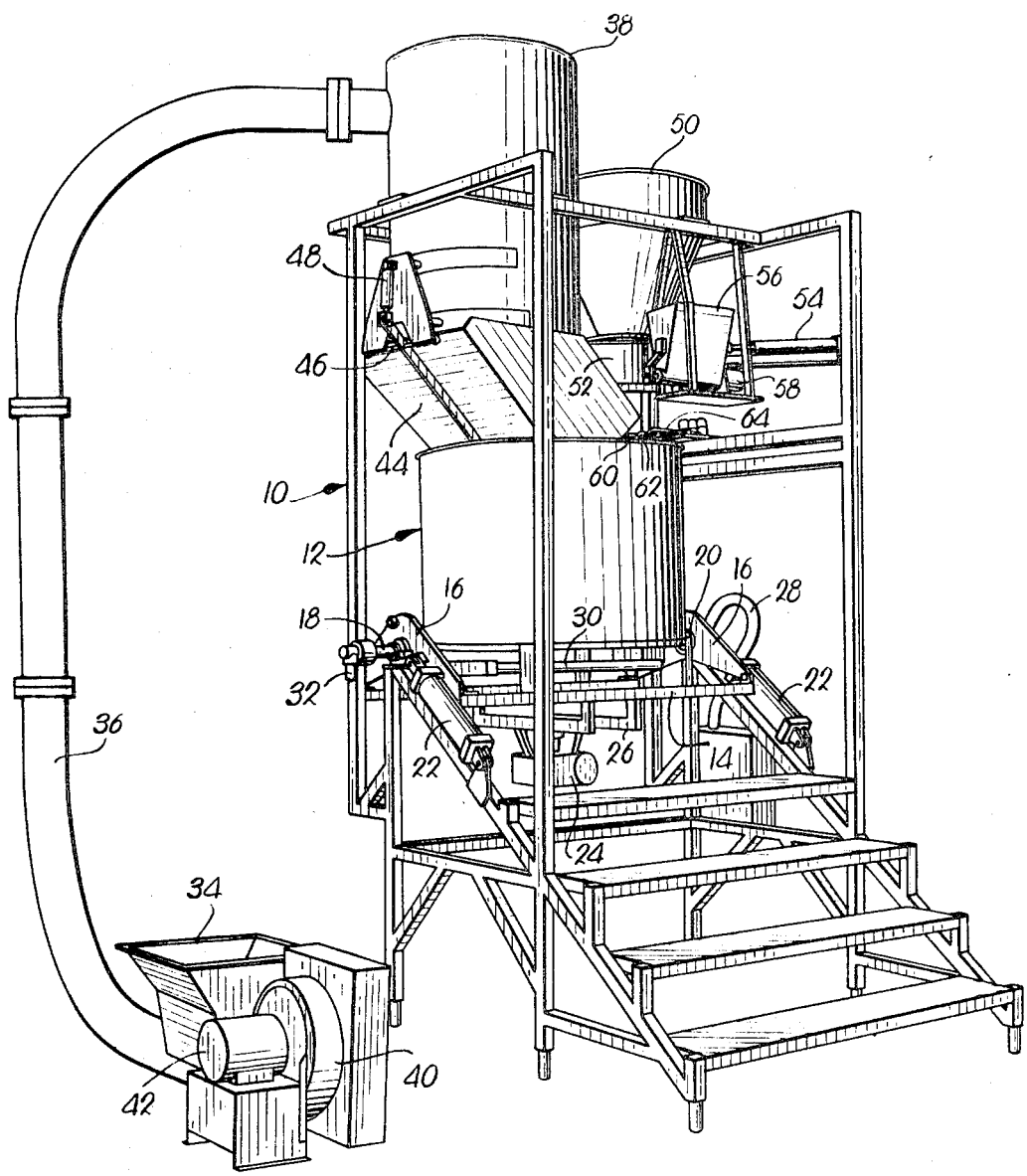
FIG. 1 is a perspective view of an automatic food processing machine made pursuant to our present invention and capable of use in carrying out the method of the instant invention.

In FIG. 1 of the drawings, framework 10 supports an open top, thin wall kettle 12, preferably made from aluminum or the like, for movement to and from a dumping position as shown by dash lines in FIG. 2. Kettle 12 is mounted on a frame 14 having side plates 16 that are journaled on framework 10 by tubular stub shafts 18 and 20. Piston and cylinder assemblies 22, controlled by fluid pressure, and interconnecting plates 16 and framework 10, operate to tilt the kettle 12.

Kettle 12 contains a rotatable agitator (not shown) preferably of the kind disclosed in U.S. Pat. No. 3,156,451 dated Nov. 10, 1964, the vertical shaft of which depends from kettle 12 and is driven by an electric motor 24 on a mount 26 depending from frame 14. The wiring for motor 24 is contained within a flexible conduit 28 passing through shaft 20. A gas heater 30, carried beneath kettle 12 by frame 14, is fed by a gas supply line 32 extending through shaft 18.

One of the ingredients, such as popped popcorn, nuts, corn balls, corn curls, or virtually any other type of food product, is delivered from a hopper 34 through a tube 36 to an open bottom bin 38 by a blower 40 driven by a motor 42. Bin 38 is secured to framework 10 above kettle 12 and carries a dumping chute 44 which feeds the food product from bin 38 to kettle 12 when chute 44 is in the position shown in FIG. 1. Chute 44 is swingable on hinge 46 and controlled by piston-cylinder unit 48.

A hopper 50 on framework 10 above kettle 12 is provided with suitable mechanism 52 therebeneath and controlled by piston-cylinder unit 54 for feeding a measured quantity of a food ingredient, e.g., nut meats, whole nuts such as peanuts, etc., to kettle 12 each time unit 54 is actuated. A container 56 for an emulsifier such as baking soda or lecithin has an auger (not shown) driven by motor 58 for feeding a measured quantity of the emulsifier into kettle 12. Three nozzles 60, 62 and 64 empty directly into kettle 12, nozzle 60 for feeding a blend of sugars (including brown sugar), a sugar solution, corn syrup, or the like, nozzle 62 for feeding a first flavoring agent such as a cooking fat, oil or butter, and nozzle 64 for feeding a second flavoring agent such as a cooking fat, oil or butter, in each case either animal or vegetable. The ingredients fed by nozzles 62 and 64 may be the same or different, as desired. Moreover, one of the nozzles 62 or 64 may be omitted, and also, it is not necessary under the concepts of our invention to feed any ingredient from hopper 50.

Motor 24 operates continuously and motor 42 is operated at the will of the overseer in separate circuits, not shown. The circuit illustrated in FIG. 3 is connected with a source of electrical energy through main lines 72 and 74 upon closing of switch 76. Lighting of the pilot light (not shown) for heater 30 closes switch 78, and movement of kettle 12 to the position shown in FIG. 1 closes switch 80.

Momentary closing of switch 82 causes energization of coil 84 of a latching relay 86 to close switch 88 of the latter. This in turn causes energization of motor 90 that operates a pump (not shown) to feed the first ingredient into kettle 12 via nozzle 60. Through use of a timer or volume control device for momentary closing of a switch 92, coil 94 of relay 86 is energized to unlatch switch 88.

Closing of switch 82 also causes energization of coil 96 of a latching relay 98 to close switch 100 of the latter. This causes energization of coil 102 of a solenoid valve in line 32 to ignite the heater 30. Thus the material in kettle 12 is heated while the same is continually stirred by operation of motor 24.

When the temperature of such material has been raised to a preselected, desired point, e.g., to approximately 250° F., thermostat 104 closes switch 106 to cause energization of coil 108 of a solenoid valve to feed fluid to the unit 54, thereby feeding a measured amount of a second ingredient into kettle 12. The ingredients now in kettle 12 are blended together by operation of motor 24, and during such time the temperature continues to rise because coil 102 remains energized.

When the temperature of the mixture has been raised to a still higher, preselected, desired point, e.g., to approximately 265° F. thermostat 110 closes switch 112 to cause energization of coil 114 of a solenoid valve which dumps a third ingredient into kettle 12 via nozzle 62. At the same time, a time delay relay 116 is energized to open switch 118 and deenergize coil 114, cutting off the flow through nozzle 62. Again, the ingredients now in kettle 12 are blended together by operation of motor 24, and during such time the temperature continues to rise because coil 102 remains energized.

When the temperature of the mixture has been raised to a still higher, preselected, desired point, e.g., to approximately 290° F., thermostat 120 actuates switch arm 122 to deenergize coil 102 and thereby cut off the flame of heater 30. At the same time, switch arm 122 causes energization of a coil 124 of a solenoid valve which dumps a fourth ingredient into kettle 12 via nozzle 64. Any suitable volume measuring device (not shown) may be used to deenergize coil 124.

Actuation of switch arm 122 by thermostat 120 also causes energization of coil 126 of a time delay relay 128. The ingredients now in kettle 12 continue to blend together for a selected period of time, e.g., approximately 3 seconds, whereupon switches 130 and 132 of relay 128 close. Closing of switch 130 causes motor 58 to be energized and also causes energization of a time delay relay 134. The emulsifier is fed from container 56 to kettle 12 until relay 134 opens switch 136 to break the circuit to motor 58.

Closing of switch 132 energizes coil 138 of a time delay relay 140. The emulsifier is blended into the mixture for a selected period of time, e.g., approximately 3 seconds, whereupon switches 142 and 144 of relay 140 close.

Closing of switch 142 energizes coil 146 of a solenoid valve to supply unit 48 with fluid so as to move chute 44 to the position shown in FIG. 1, emptying bin 38 of its contents for dumping into kettle 12. Closing of switch 144 energizes coil 148 of a time delay relay 150. The product from bin 38 is thoroughly blended with the cooked mixture for a selected period of time, e.g., approximately 3 seconds, whereupon switches 152 and 154 of relay 150 close.

Closing of switch 152 causes energization of coil 156 of a solenoid valve which controls the flow of fluid to assemblies 22 to dump the end product from kettle 12 as shown in FIG. 2. Dumping of kettle 12 also opens switch 80 as a safety measure to be sure that gas coil 102 is deenergized.

Closing of switch 154 energizes coil 158 of a time delay relay 160. After sufficient time for dumping has expired, coil 158 actuates switch arm 162 of relay 160 to deenergize coil 156, whereupon kettle 12 returns to its upright position. Arm 162 energizes coil 164 of relay 98 to unlatch switch 100, placing the machine in condition for production of the next batch. Such return of kettle 12 to its upright position closes switch 82 momentarily, starting the next cycle.

In a typical machine each batch of approximately 60 pounds can be processed about 10 to 12 minutes. In further reference to U.S. Pat. No. 3,156,451 aforementioned, continued rotation of the agitator within kettle 12 not only thoroughly blends together the cooked ingredients with the emulsifier, but effects an excellent blending of the final ingredient without breakage if popcorn or the like is selected, permitting the use of virtually any type of food, even the extremely flaky types of popcorn. The blending in the instant machine is quite gentle and effects a very even blending of the cooked solution with the food product last to be added in the process.

The exemplary nature of the circuit above described and of the steps and ingredients chosen to describe our invention cannot be overemphasized. Of great importance is the fact that the cooking phase of the process is carried out within a preselected step-by-step rise in temperature, wholly apart from time. Noteworthy then is the fact that the cooking phase will be influenced by many factors such as ambient temperature, the nature and amount of ingredients in each batch, and the extent to which the ingredients are preheated, if at all, prior to discharge into kettle 12.

On start up with a cold kettle, the overall time to complete the first cycle may well be slightly longer than the time required to process the next succeeding batches. But time is of no consequence because the second ingredient is not added until a preselected temperature is reached even if it takes longer to reach such temperature when starting with a cold kettle. Conversely, if the first ingredient is preheated, the time required to reach the first temperature is somewhat reduced. We have found it desirable, however, when preheating, not to raise the temperatures so high as to precook the ingredients.

In the temperature and time controls and in the selected sequence of adding ingredients it is also important to keep in mind various melting and boiling points because it may be undesirable to lose certain highly volatile substances during the completion of the cooking and blending steps. For example, when certain types of emulsifiers are used it is inadvisable to add the emulsifier too soon because it may tend to boil away before becoming fully effective. On the other hand, a certain amount of loss of volatile components in most flavoring agents will not usually detract from their flavoring action.

Equally important is color and taste. Care must be taken, for example, to avoid a burnt taste, and oftentimes an extremely dark color in the end product may adversely affect its marketability. Yet, heat should not be removed too soon such as to produce a product that is only partially cooked. Relative proportions of the ingredients must also b kept in mind; for example, it is sometimes difficult to avoid using too much emulsifier, resulting in a rather bland taste.

All of the above factors are easily controlled by using the process of our invention. Rapid heat transfer through use of an aluminum kettle not only reduces the cooking time but helps dissipate the heat quickly after the flame from the burner is extinguished during each cycle. Keeping in mind that all heat is not removed simply by closing of the gas supply to the burner, the extent to which the temperature rises beyond 290° F., for example, after the flame is removed becomes important. Certain products may burn if the temperature drifts to or above about 315° F. to 320° F.

On the other hand, shortly after adding the emulsifier there is a very noticeable foaming or bubbling action which of itself results in some cooling. It may not be necessary to remove the flame precisely at the moment of adding the emulsifier, but such continued positive heating should not be unduly extended.

In summary then, it is contemplated that the end product be in the form of a solid nutriment as opposed to a drink and include such foods as candies, snacks, appetizers and condiments. That step in the process immediately prior to dumping of the kettle 12 constitutes the blending for a predetermined period of time of two food products in kettle 12, one of which has previously been cooked in the kettle 12. The coked product, in the case of caramel corn, with or without peanuts, includes sugar, which may be liquid, and a flavoring agent which may be added in one or in several steps. The emulsifier is added after the cooking is complete at or about 290° F. with the flame extinguished at least prior to adding the popcorn, and when this is done, the kettle 12, by its very nature, will cool quickly enough, by the foaming action of the emulsifier and the blending of the popcorn with the cooked product, to avoid burning and eliminate excessive darkening of the final product.

Having thus described the invention, what is claimed as new and desired to be secured by Letters Patent is:

1. The method producing a nutriment which comprises the steps of: ingredients
    blending the ingredients of a first food product in a cooking vessel while heating the product to raise the temperature thereof and thereby cook the same, said ingredients being fed to the vessel sequentially on temperature signals as said heating progressively raises the temperature of said first product; discontinuing said heating after the product reachs a predetermined temperature while continuing said blending;
    blending said vessel with a second food product during said blending and after said temperature is reached; blended
    blending said products in said vessel during and after the addition of said second product.

2. The method of producing a nutriment as claimed in claim 1, wherein an emulsifier is blended in said vessel with said first product for a predetermined period of time prior to charging the vessel with the second product and commencing as soon as said temperature is reached.

3. The method of producing a nutriment as claimed in claim 2, wherein said ingredients are fed to the vessel sequentially on temperature signals as said heating progressively raise the temperature of said first product.

4. The method of producing a nutriment as claimed in claim 3, wherein said products are blended for a predetermined period of time.

5. the method of making caramel corn which comprises the steps of:
    heating and stirring a food product containing a sugar solution;
    continuing said heating while blending a flavoring agent with said product as soon as a predetermined temperature is reached;
    continuing said blending for a first predetermined period of time after said temperature is reached;

blending an emulsifier with said product and agent as soon as said first period of time has expired;

continuing said blending for a second predetermined period of time; and as soon as said second period of time has expired, blending popped popcorn with said product, agent and emulsifier for a third predetermined period of time.

6. The method of making caramel corn as claimed in claim 5; and discontinuing said heating as soon as said temperature is reached.

7. The method of making caramel corn as claimed in claim 5, wherein said food product is corn syrup.

8. The method of making caramel corn as claimed in claim 5, wherein said emulsifier is lecithin.

9. The method of making caramel corn which comprises the step of:

heating and stirring a food product containing a sugar solution;

continuing said heating while blending edible nuts with said product as soon as a first predetermined temperature is reached;

continuing said heating while blending a cooking fat with said product and nuts as soon as a second predetermined temperature is reached;

continuing said blending for first predetermined period of time after said second temperature is reached;

blending an emulsifier with said product, fat and nuts as soon as said first period of time has expired;

continuing said blending for a second predetermined period of time; and as soon as said second period of time has expired, blending popped popcorn with said product, nuts, fat and emulsifier for a third predetermined period of time.

10. The method of making caramel corn as claimed in claim 9, wherein said cooking fat is butter.

11. The method of making caramel corn which comprises the steps of:

heating and stirring a food product containing a sugar solution;

continuing said heating while blending a first cooking fat with said product as soon as a first predetermined temperature is reached;

continuing said heating while blending a second cooking fat with said product and first fat as soon as a second predetermined temperature is reached;

continuing said blending for a first predetermined period of time after said second temperature is reached;

blending an emulsifier with said product and fats as soon as said first period of time has expired;

continuing said blending for a second predetermined period of time; and as soon as said second period of time has expired, blending popped popcorn with said product, fats and emulsifier for a third predetermined period of time.

12. The method of making caramel corn which comprises the steps of:

heating and stirring a food product containing a sugar solution;

continuing said heating while blending edible nuts with said product as soon as a first predetermined temperature is reached;

continuing said heating while blending a first cooking fat with said product as soon as a second predetermined temperature is reached;

continuing said heating while blending a second cooking fat with said product, nuts and first fat as soon as a third predetermined temperature is reached;

continuing said blending for a first predetermined period of time after said third temperature is reached;

blending an emulsifier with said product, nuts and fats as soon as said first period of time has expired;

continuing said blending for a second predetermined period of time; and as soon as said second period of time has expired, blending popped popcorn with said product, nuts, fats and emulsifier for a third predetermined period of time.

13. The method of making caramel corn which comprises the steps of:

heating and stirring a food product containing a sugar solution;

continuing said heating while blending a first predetermined quantity of a cooking fat with said product as soon as a first predetermined temperature is reached;

continuing said heating while blending a second predetermined quantity of said cooking fat with said product and first quantity of fat as soon as a second predetermined temperature is reached;

continuing said blending for a first predetermined period of time after said second temperature is reached;

blending an emulsifier with said product and fats as soon as said first period of time has expired;

continuing said blending for a second predetermined period of time; and as soon as said second period of time has expired, blending popped popcorn with said product, fats and emulsifier for a third predetermined period of time.

14. The method of making caramel corn which comprises the steps of:

heating and stirring corn syrup;

continuing said heating while blending peanuts with said syrup as soon as a first predetermined temperature is reached;

continuing said heating while blending cooking fat with said syrup and peanuts as soon as a second predetermined temperature is reached;

discontinuing said heating and blending additional cooking fat with said syrup and peanuts as soon as a third predetermined temperature is reached; continuing said blending for a first predetermined period of time after said third temperature is reached;

blending an emulsifier with said syrup, peanuts and fat as soon as said first period of time has expired;

continuing said blending for a second predetermined period of time; and as soon as said second period of time has expired, blending popped popcorn with said syrup, peanuts, fats and emulsifier until the popcorn is coated with the admixture of syrup and fat.

15. In a machine for making caramel corn:

an open top kettle tiltable to and from a position dumping the contents thereof;

an agitator in the kettle for stirring said contents;

heater means in heat exchange relationship to the kettle for raising the temperature of said contents;

means for charging the kettle with a quantity of a sugar solution for stirring by said agitator;

means for feeding the kettle with a supply of cooking fat for blending with said solution by the agitator;

means responsive to an increase to a predetermined temperature of the solution in said kettle and operably coupled with said feeding means for actuating the latter;

means for discharging an emulsifier into the kettle for blending with the solution and the fat by the agitator;

first time control means operably coupled with said discharging means and said feeding means for actuating the discharging means in response to the lapse of a first predetermined period of time after operation of said feeding means;

means for dumping popped popcorn into said kettle for coating the popcorn with the blended solution, ft and emulsifier; and second time control means operably coupled with said dumping means and said discharging means for actuating the dumping means in response to the lapse of a second predetermined period of time after operation of said discharging means.

16. In a machine for making caramel corn as claimed in claim 15, wherein is provided means for adding peanuts to said solution in the kettle prior to said dumping of popcorn into the kettle.

17. In a machine for making caramel corn as claimed in claim 16, wherein means is provide for feeding said fat to the kettle in two distinct steps.

18. In a machine for making caramel corn as claimed in claim 17, wherein thermal control means is provided to add the peanuts after the solution reaches a first temperature, to feed the first supply of fat to the kettle after a second temperature is reached, and to feed the second supply of fat to the kettle after a third temperature is reached.